US008831986B2

(12) United States Patent
Agarwal et al.

(10) Patent No.: US 8,831,986 B2
(45) Date of Patent: Sep. 9, 2014

(54) FEES AND FOREIGN CURRENCY EXCHANGE CALCULATION

(75) Inventors: Vinit Agarwal, Sunnyvale, CA (US); Steven Todd Black, Menlo Park, CA (US); Ravi Devesetti, Fremont, CA (US); Tyler C Grant, East Palo Alto, CA (US); Nicholas Peddy, Mountain View, CA (US); Kristian Widjaja, Union City, CA (US)

(73) Assignee: Ebay Inc., San Jose, CA (US)

( * ) Notice: Subject to any disclaimer, the term of this patent is extended or adjusted under 35 U.S.C. 154(b) by 631 days.

(21) Appl. No.: 12/828,013

(22) Filed: Jun. 30, 2010

(65) Prior Publication Data

US 2012/0005054 A1    Jan. 5, 2012

(51) Int. Cl.
*G06Q 40/00* (2012.01)
*G06Q 20/38* (2012.01)
*G06Q 40/02* (2012.01)
*G06Q 40/06* (2012.01)
*G06Q 40/04* (2012.01)

(52) U.S. Cl.
CPC .............. *G06Q 40/00* (2013.01); *G06Q 40/02* (2013.01); *G06Q 40/06* (2013.01); *G06Q 20/381* (2013.01); *G06Q 40/04* (2013.01); *G06Q 40/025* (2013.01)
USPC .......................................... 705/35; 705/14.15

(58) Field of Classification Search
CPC ... G06Q 40/00; G06Q 20/381; G06Q 40/025; G06Q 40/04; G06Q 40/06; G06Q 40/02
USPC ................................................ 705/35, 14.15
See application file for complete search history.

(56) References Cited

U.S. PATENT DOCUMENTS

| 7,337,142 | B1* | 2/2008 | Holmes et al. | 705/39 |
|---|---|---|---|---|
| 8,121,923 | B1* | 2/2012 | Ruccolo | 705/35 |
| 8,468,090 | B2* | 6/2013 | Lesandro et al. | 705/39 |
| 8,626,653 | B1* | 1/2014 | Krikorian et al. | 705/39 |
| 2001/0056398 | A1* | 12/2001 | Scheirer | 705/38 |
| 2008/0140568 | A1* | 6/2008 | Henry | 705/40 |
| 2008/0147516 | A1* | 6/2008 | Rousso et al. | 705/27 |
| 2009/0063261 | A1* | 3/2009 | Scribner et al. | 705/14 |
| 2011/0060674 | A1* | 3/2011 | King | 705/37 |
| 2011/0282780 | A1* | 11/2011 | French et al. | 705/39 |
| 2012/0036063 | A1* | 2/2012 | Sivapathasundram et al. | 705/39 |

OTHER PUBLICATIONS

Ojala, M. (1994). Cross-border data comparisons. Online, 18(3), 105. Retrieved Apr. 30, 2014.*
Talbot, D. (May 31, 1998). Web untangles world currency conversions. South China Morning Post. Retrieved Apr. 30, 2014.*

* cited by examiner

*Primary Examiner* — Kito R Robinson
(74) *Attorney, Agent, or Firm* — Haynes and Boone, LLP

(57) ABSTRACT

Various methods, apparatus, and systems are disclosed for calculating a fee linked to an online financial transaction. In one embodiment, a method includes receiving a fee calculation request linked to an online financial transaction associated with a fee type, a country code, and a client identifier; and then selecting, using a microprocessor, an initial base fee from either a default base fee determined by the fee type and the country code or from an overriding base fee associated with the financial transaction, wherein the initial base fee includes a transaction percentage and a fixed amount. The method further includes applying, using the microprocessor, at least one adjustment to the initial base fee to calculate a final fee, the at least one adjustment being applied when an associated condition set is determined to be true.

20 Claims, 9 Drawing Sheets

400

| Country (402) | Min Volume (404) | Max Volume (406) | Currency (408) | Level (410) | ID (412) |
|---|---|---|---|---|---|
| default | 0 | 3000 | USD | 1 | 1 |
| default | 3000 | 10000 | USD | 2 | 2 |
| default | 10000 | 100000 | USD | 3 | 3 |
| default | 100000 | infinite | USD | 4 | 4 |
| US | 0 | 3000 | USD | 1 | 5 |
| US | 3000 | 10000 | USD | 2 | 6 |
| US | 10000 | 100000 | USD | 3 | 7 |
| US | 100000 | infinite | USD | 4 | 8 |
| JP | 0 | 5000 | USD | 1 | 9 |
| JP | 5000 | 10000 | USD | 2 | 10 |
| JP | 20000 | 100000 | USD | 3 | 11 |
| JP | 300000 | infinite | USD | 4 | 12 |
| default | 0 | 2500 | EUR | 1 | 13 |
| default | 2500 | 10000 | EUR | 2 | 14 |
| default | 10000 | 50000 | EUR | 3 | 15 |
| default | 50000 | 100000 | EUR | 4 | 16 |
| default | 100000 | infinite | EUR | 5 | 17 |
| FR | 0 | 2500 | EUR | 1 | 18 |
| FR | 2500 | 10000 | EUR | 2 | 19 |
| FR | 10000 | 50000 | EUR | 3 | 20 |
| FR | 50000 | 100000 | EUR | 4 | 21 |
| FR | 100000 | infinite | EUR | 5 | 22 |

FIG. 4

FEES AND FOREIGN CURRENCY EXCHANGE CALCULATION

BACKGROUND

The present invention generally relates to Internet commerce, and more particularly to methods, apparatus, and systems for calculating fees for online financial services.

The number of financial transactions over the Internet is growing rapidly, with the acceptance and growth of online commerce, online banking, and so forth. Typical electronic financial transactions can involve the use of credit cards, debit cards, and other electronic payment services for the payment of goods, services, bills, personal debts, foreign currency exchanges, donations, and so forth.

A number of companies offer electronic payment (or funds transfer) services, such as PayPal, Inc. of San Jose, Calif. Such electronic payment services naturally charge for the provision of such services, typically on a per-transaction basis, and often include fixed or static transaction charges. Thus, conventional transaction charges have been based on fixed dimensions of calculation that do not change over time or incur a significant cost to change. However, a need has arisen for the capability to easily adjust charges to adapt to new market conditions and/or to facilitate agreements with merchants.

Accordingly, there is a growing need for a flexible, extensible, dynamic, and auditable fee framework to address the problems of defining and assigning transaction charges for online financial services.

SUMMARY

The present disclosure provides an easily adaptable, extensible, dynamic, and auditable fee calculation system, apparatus, and method in many different embodiments.

One of the broader forms of the present disclosure involves a method of calculating a fee for an online transaction. The method includes receiving a fee calculation request linked to an online financial transaction associated with a fee type, a country code, and a client identifier; and then selecting, using a microprocessor, an initial base fee from either a default base fee determined by the fee type and the country code or from an overriding base fee associated with the financial transaction, wherein the initial base fee includes a transaction percentage and a fixed amount. The method further includes applying, using the microprocessor, at least one adjustment to the initial base fee to calculate a final fee, the at least one adjustment being applied when an associated condition set is determined to be true. The associated condition set may include one or more conditions.

Another of the broader forms of the present disclosure involves a method of calculating a fee for an online transaction. The method includes receiving a fee calculation request linked to an online financial transaction associated with a fee type, a country code, and a client identifier; and accessing a cached database including a plurality of overriding base fees each linked to a client identifier, and a plurality of default base fees each linked to a fee type and a country code. The method further includes selecting, using a microprocessor, an initial base fee from either a default base fee determined by the fee type and the country code or from an overriding base fee associated with the financial transaction, wherein the initial base fee includes a transaction percentage and a fixed amount; and then applying, using the microprocessor, a plurality of adjustments to the initial base fee to calculate a final fee, each of the plurality of adjustments being applied when an associated condition set is determined to be true.

Yet another of the broader forms of the present disclosure involves a fee calculation server. The server includes a communication interface configured to receive a fee calculation request linked to an online financial transaction associated with a fee type, a country code, and a client identifier; a database including a plurality of overriding base fees each linked to a client identifier, and a plurality of default base fees each linked to a fee type and a country code; and a processor coupled to a memory. The processor is programmed to calculate a final fee by: determining whether an overriding base fee is associated with the financial transaction; selecting an initial base fee from either a default base fee determined by the fee type and the country code or from an overriding base fee associated with the financial transaction, wherein the initial base fee includes a transaction percentage and a fixed amount; and applying at least one adjustment to the initial base fee to calculate the final fee, the at least one adjustment being applied when an associated condition set is determined to be true.

These and other features and advantages of the present invention will be more readily apparent from the detailed description of the embodiments set forth below taken in conjunction with the accompanying drawings.

BRIEF DESCRIPTION OF THE FIGURES

Aspects of the present disclosure are best understood from the following detailed description when read with the accompanying figures. It is emphasized that various features may not be drawn to scale. In fact, the dimensions of the various features may be arbitrarily increased or reduced for clarity of discussion. Furthermore, like element numbers in different figures may represent the same or similar elements.

FIG. 4 illustrates a volume tier table according to various aspects of the present disclosure.

DETAILED DESCRIPTION

Figure 1:
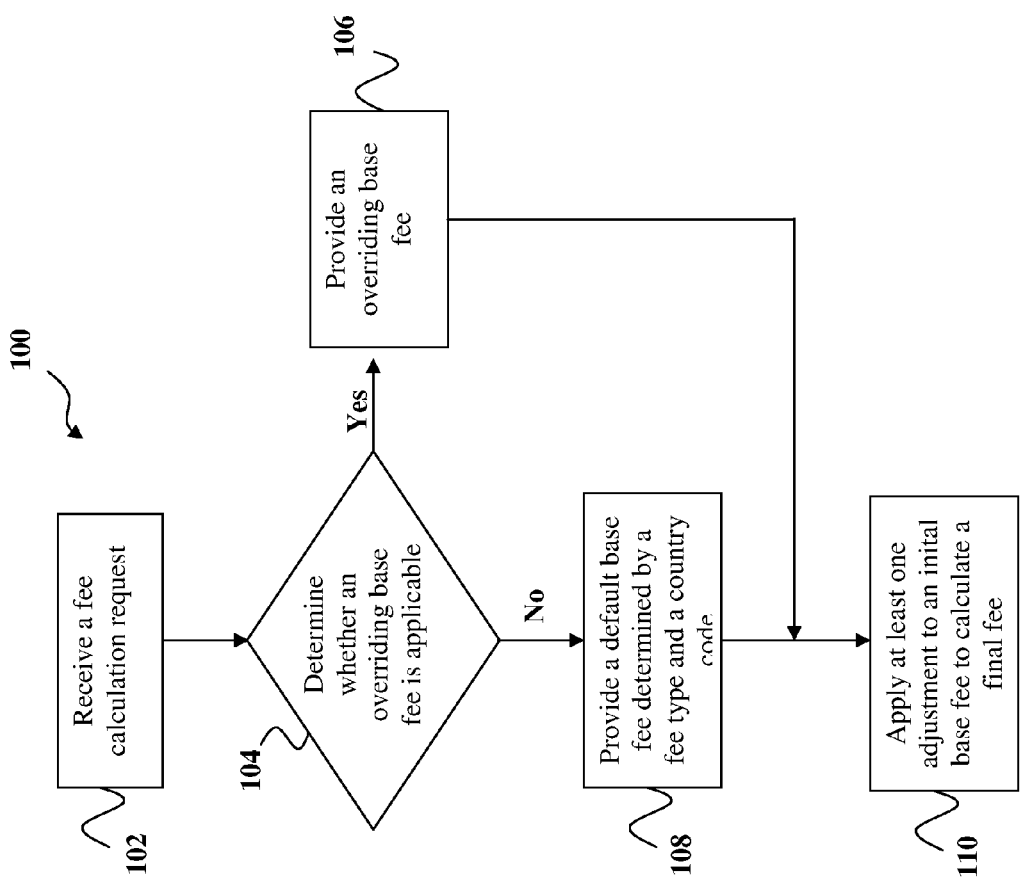
FIG. 1 is a flowchart illustrating a method of calculating a fee for an online financial transaction according to various aspects of the present disclosure.

The present disclosure relates generally to online financial transactions, and more particularly, to methods, apparatus, and systems for determining and providing fees for financial transaction services.

It is understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat or use similar reference numerals and/or letters in the various examples. This repetition is for the purpose of simplicity and clarity and does not in itself dictate a relationship between the various embodiments and/or configurations discussed.

The following definitions will apply throughout this document according to aspects of the present disclosure.

Fee: an amount of money to be charged for an online financial service.

Fee type: a categorization of different ways to apply fees, or a categorization of different online financial transactions to which fees are applied; e.g., receiver fee, personal payment fee, withdrawal fee, currency exchange fee.

Country code: a code for a country where funds in a financial transaction are being received.

Base fee: a transaction percentage and a fixed amount; e.g., "2.9%+0.30 USD".

Adjustment: an optional transaction percentage and/or a fixed amount that is added to or subtracted from a base fee when a condition or a plurality of conditions are met or are determined to be true.

Condition: a logical test (true/false) for a particular statement which may include Boolean comparison operators such as "AND", "OR", "EQUAL TO", "GREATER THAN", "LESS THAN", and so forth; e.g., "the funding source is a credit card and the payment flow is a virtual terminal", "the transaction amount is less than $10", "the sender country is Germany", "the receiver country is the United States", "the payment flow is a direct credit card or a virtual terminal", "the transaction is cross border", time-based conditions such as an active time or an expiration time for the adjustment, and minimum or maximum fee after an adjustment.

Referring now to FIG. 1, a flowchart illustrates a method 100 of calculating a fee for an online financial transaction according to various aspects of the present disclosure. Method 100 begins at block 102 in which a fee calculation request is received by a server, for example by a fees and foreign currency exchange (FFX) server which is further described below. The fee calculation request is linked to an online financial transaction. The financial transaction is associated with a fee type, a country code, and a client identifier. The method continues with decision block 104, in which the applicability of an overriding base fee is determined. In one aspect, the FFX server may determine whether an overriding base fee is associated with the financial transaction or a client identifier. If yes, the overriding base fee is looked up and used as an initial base fee, as shown in block 106. If no, a default base fee is looked up based on a fee type and a country code associated with the financial transaction, and used as an initial base fee, as shown in block 108. In other words, the server selects an initial base fee from either a default base fee determined by the fee type and the country code or from an overriding base fee associated with the financial transaction. The initial base fee includes a transaction percentage and a fixed amount. In one aspect, the FFX server may look up overriding and default base fee data from a database to determine the initial base fee to be associated with the financial transaction. Finally, at step 110, at least one adjustment is applied to the initial base fee to calculate a final fee to be charged for the financial transaction.

It is understood that additional process steps may be performed to complete the calculation of a final fee linked to the online financial transaction. For example, additional processes may occur before, in between, and after, the steps shown and described above with respect to FIG. 1.

For example, in one aspect of the present disclosure, the fee type associated with the financial transaction is one of a receiver fee, a personal payment fee, a withdrawal fee, a withdrawal return fee, an automatic teller machine (atm) cash advance fee, or a currency exchange fee. In another aspect of the present disclosure, the overriding base fee is a promotional base fee or a contractual base fee. In another aspect, the at least one adjustment changes both the transaction percentage and the fixed amount of the initial base fee. In another aspect, the at least one adjustment is applied if an associated condition set is determined to be true. A condition of the condition set may be selected from a logical test for a transaction amount, a funding source, a sender country, a receiver country, a payment flow type, a cross border transaction, a foreign currency exchange, or a combination thereof. In another aspect, the condition includes a time constraint or a maximum or minimum fee constraint. In another aspect, the method further comprises applying a discount transaction percentage to the initial base fee determined by a dynamic volume tier associated with the client identifier. The dynamic volume tier may be determined by a monthly total payment volume associated with the client identifier. In another aspect, the method further comprises applying a plurality of adjustments to the initial base fee to calculate the final fee. In yet another aspect, the method further comprises accessing a cached database including a plurality of overriding base fees each linked to a client identifier, and a plurality of default base fees each linked to a fee type and a country code. A registration cycle may also be included, in which data about a client, a client device, and/or a client account are obtained and linked.

Figure 2A:
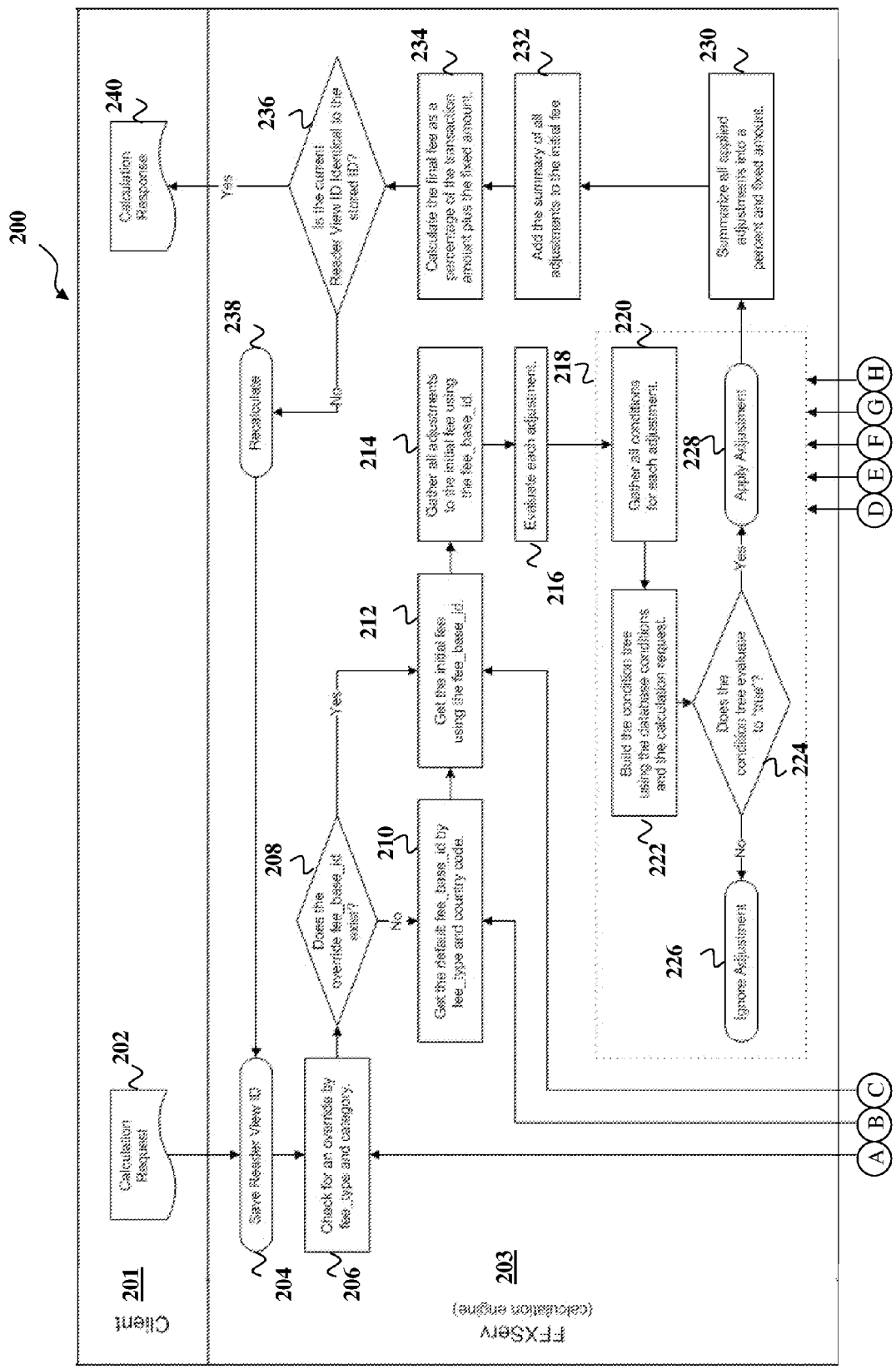
FIGS. 2A-2B illustrate a flowchart showing another method of calculating a fee for an online financial transaction according to various aspects of the present disclosure.
Figure 2B:
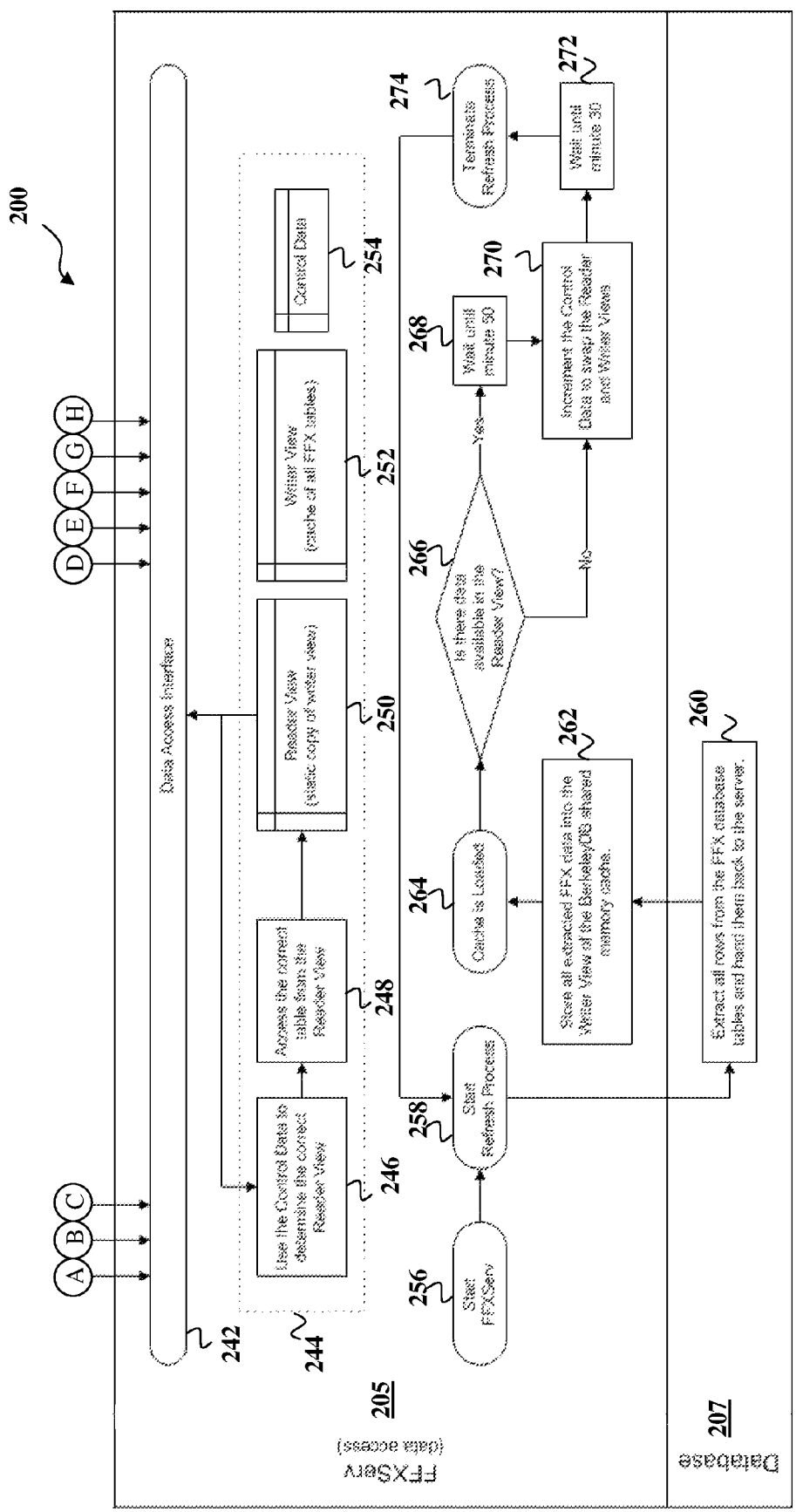

Referring now to FIGS. 2A-2B, a flowchart is illustrated showing another method 200 of calculating a fee for an online financial transaction according to various aspects of the present disclosure. At block 202, a calculation request is sent from a client device 201 (see also, a client device 620 in FIG. 6) and received by a calculation engine 203 of a fee calculation server (see also, a FFX server 610 in FIG. 6) via a network (e.g., a network 630 in FIG. 6). The calculation engine 203 may look up data from a database 207 via a data access portion 205 of the fee calculation server that refreshes and caches the data from database 207. It is understood that although client device 201, calculation engine 203, data access portion 205, and database 207 are illustrated as being juxtaposed next to one another, the client device, server, and database do not need to be physically adjacent but may only be in operable communication with one another.

In one aspect, the calculation request may be provided to the fee calculation server before, during, or after the financial transaction for which the fee calculation request is made. In one embodiment, a user of a client device will have already registered or will register with the fee calculation server or another server that allows the fee calculation server to recognize and/or authenticate the client device 201, the user of the client device, and/or a user's funding instrument. This may be done through login usernames, passwords, and/or computer identifiers. In this regard, it will be appreciated that the client device user will provide account information to the fee calculation server over a network through, for example, a secure connection between the fee calculation server and respective client devices. As a result of such registration, the fee calculation server may store an identifier that may be used to identify the particular client device and associated account as having an account maintained by the fee calculation server and/or a third party service provider. The identifier may be implemented, for example, as one or more cookies, Flash store objects, operating system registry entries, hardware identifiers, or other types of identifiers. The client identifier may be used for later determination of an overriding base fee as will be further explained below.

The calculation engine 203 then generates and saves a reader view identification, as shown in block 204, in order to subsequently verify a version of the data cache being used for the fee calculation. When the reader view identification is verified after a fee calculation as being identical to the original value, the fee calculation may be sent to the client. If the reader view identification is not identical, potential incorrect or inconsistent data concerns may arise and the fee may be recalculated. In one aspect, the reader view identification is a non-decreasing integer that is incremented each time a cache view is exchanged and/or swapped.

At block 206, the method continues with a check for an overriding base fee or a determination of whether an overriding base fee is applicable for the financial transaction. The applicability of an overriding base fee may be checked based upon the client identifier, the fee type associated with the financial transaction, and/or the country code associated with the financial transaction. In one aspect, the calculation engine 203 may determine whether an overriding base fee identifier is associated with the financial transaction or the client identifier, as shown in decision block 208. If yes, the overriding base fee is used as the initial base fee, as shown in block 212. If no, a default base fee is determined or looked up based on a fee type and a country code associated with the financial transaction, as shown in block 210, and the default base fee is then used as the initial base fee, as shown in block 212. An overriding base fee may be applied to groups of clients (e.g., groups of merchants) for scalability and may also be used for custom pricing that replaces country pricing. In one example, an overriding base fee may include a promotional rate, such as 0% receiver fees for a limited time, or a contractual rate for a particular client, such as a particular transaction percentage with zero fixed amount for a particular large volume client.

The method continues with block 214, in which an adjustment or a plurality of adjustments to the initial base fee are gathered or collected, and then the adjustments are evaluated to determine whether the adjustments should be applied to the initial base fee, as shown in block 216. The method continues to an adjustment evaluation section 218.

Adjustment evaluation section 218 determines whether an associated condition set, including a condition or a plurality of conditions to applying an adjustment to the initial base fee, is met or true. If the condition set is met or true, the adjustment is applied to the initial base fee. If the condition set is not met or false, the adjustment is not applied to the initial base fee. At block 220, all conditions for each adjustment is gathered, and then a condition tree is built using the adjustment conditions and the calculation request, as shown in block 222. At decision block 224, the method continues with a determination of whether a condition tree is evaluated to be "true". If no, the adjustment associated with the failed condition tree is ignored, as shown in block 226. If yes, the adjustment associated with the true condition tree is applied to the initial base fee, as shown in block 228.

In one aspect, dynamic volume tiers may be applied as an adjustment to the initial base fee. Volume tiers are defined as discount adjustments of varying degree based upon a volume of fees per client identifier processed by the fee calculation server or a third party service provider. In one example, a number of volume tiers may be defined by different minimum and maximum volumes, and each tier may be associated with a different discount adjustment, with volume tiers having larger volumes being associated with larger discount adjustments. In yet another example, a volume tier discount adjustment may have a condition of a certain fee volume range from a client identifier before being applied to the initial fee. In other embodiments, a volume tier discount may be determined through a lookup table, and may not be applied as a conditional adjustment. The volume of fees for determining a volume tier may be based on a client's month to date volume, a monthly average of fees over three months, apply to all currencies for a client, or may be determined by other volume-based parameters. In one embodiment, a batch tool may run on a daily basis to daily recalculate client volume-based parameters.

The method continues from block 228 to block 230, in which all applied adjustments are summed into a transaction percentage and a fixed amount. At block 232, the summed adjustments are applied or added to the initial base fee. At block 234, the final fee is calculated as a percentage of the transaction amount and the fixed amount.

At decision block 236, the method continues with a determination whether the reader view identifier is identical to the stored reader view identifier from block 204 in order to provide the calculated final fee to the same client requester or fee calculation requester taking into consideration potential incorrect or invalid data in the calculation resulting from a cache exchange or swap.

If yes (i.e., the two numbers are the same), the server provides the final fee to the client 201, as shown in block 240. If no (i.e., the two numbers are different), the method loops back to block 238 for a recalculation of the fee without returning to the client and to block 204 to save the new reader view identifier. The final fee may be presented to the client device for acceptance of the fee prior to a proposed financial transaction, during the transaction, or after completion of the financial transaction. Prompts at the client device may be displayed by a browser application, and the user interface at the client device may be configured to respond to commands provided by a user through a suitable user input device of the buyer device, such as a mouse, keyboard, or other input device.

In one aspect, the calculation engine 203 may look up a database 207 (or databases) for the determinations and/or calculations described above, as shown by double sided arrows "A" through "H" between calculation engine 203 and a data access portion 205 of the server, which accesses the database 207. Such a database or databases (e.g., FFX database 615 in FIG. 6) may include overriding base fee data, default base fee data, adjustment data and condition data, fee type data, country code data, volume tier data, client identifier data, and so forth. The database may further have client account fund data including account fund amounts, history of transactions, fund distributions, etc. Client accounts may be associated with individual users or groups such as corporations or charitable organizations. The server may also have access to other data, such as tracking data, and/or data from third-parties such as eBay, Google, Yahoo, etc. The data to be accessed for the determinations and/or calculations may be accessed in raw data form, via codes, via identifiers, or other links.

Data access portion 205 includes a data access interface 242 coupled to a data cache section 244 including a reader view block 250, a writer view block 252, and a control data block 254. Reader view block 250 includes a static copy of the writer view data, and the writer view block 252 includes a cache of relevant fee calculation tables from the database 260. The method 200 further includes using control data from control data block 254 to determine the correct reader view for data look up, as shown in block 246, and then accessing the correct table from the reader view, as shown in block 248. Data from the correct table of the reader view is then sent to calculation engine 203 through data access interface 242, as shown by the arrow to data access interface 242 from reader view block 250.

In one embodiment, data access portion 205 of the fee calculation server follows a method of refreshing and caching data for making dynamic data (e.g., month to date volume of fees) readily available for lookup by calculation engine 203. A data refreshing method begins when starting up the fee calculation server, as shown in block 256. The data refreshing method continues to the start of a data refresh process, as shown in block 258. Data is extracted from database 207 and handed to data access portion 205 of the server, as shown in block 260. The method continues with block 262, in which all extracted data is stored in the cache of the writer view block 252, and at block 264 the cache is loaded. At decision block 266, a determination is made whether data is available in the reader view block 250. If yes, a certain refresh time is applied, such as 50 minutes, as shown in block 268. If no, the control data in control data block 254 is incremented to swap the reader view with the writer view, as shown in block 270. Another refresh time is applied, such as 30 minutes, as shown in block 272, and then the refresh process is terminated, as shown in block 274. The method loops back to restart the refresh process at block 258.

It is noted that in one aspect, the fee calculation server may support more than two views onto the relevant fee calculation data. The logic behind the reader view identification may only redo the calculation (loop back to block 238 from decision block 236) when the writer view has overwritten the original reader view. For example, with four views (0, 1, 2, 3), a reader can start at view 1 and the writer can fill views 2, 3, and 0 before recalculating the fee. Once the writer is pointing again to view 1, a data consistency or invalidity issue may arise and hence the fee calculation server may redo the calculation prior to sending the fee to the client. In another example, the reader view identification may be created by "ID mod 4" such that a reader view ID of 1, 5, 9, 13 would all equate to looking at view 1 of 4 (0, 1, 2, 3).

Figure 3A:
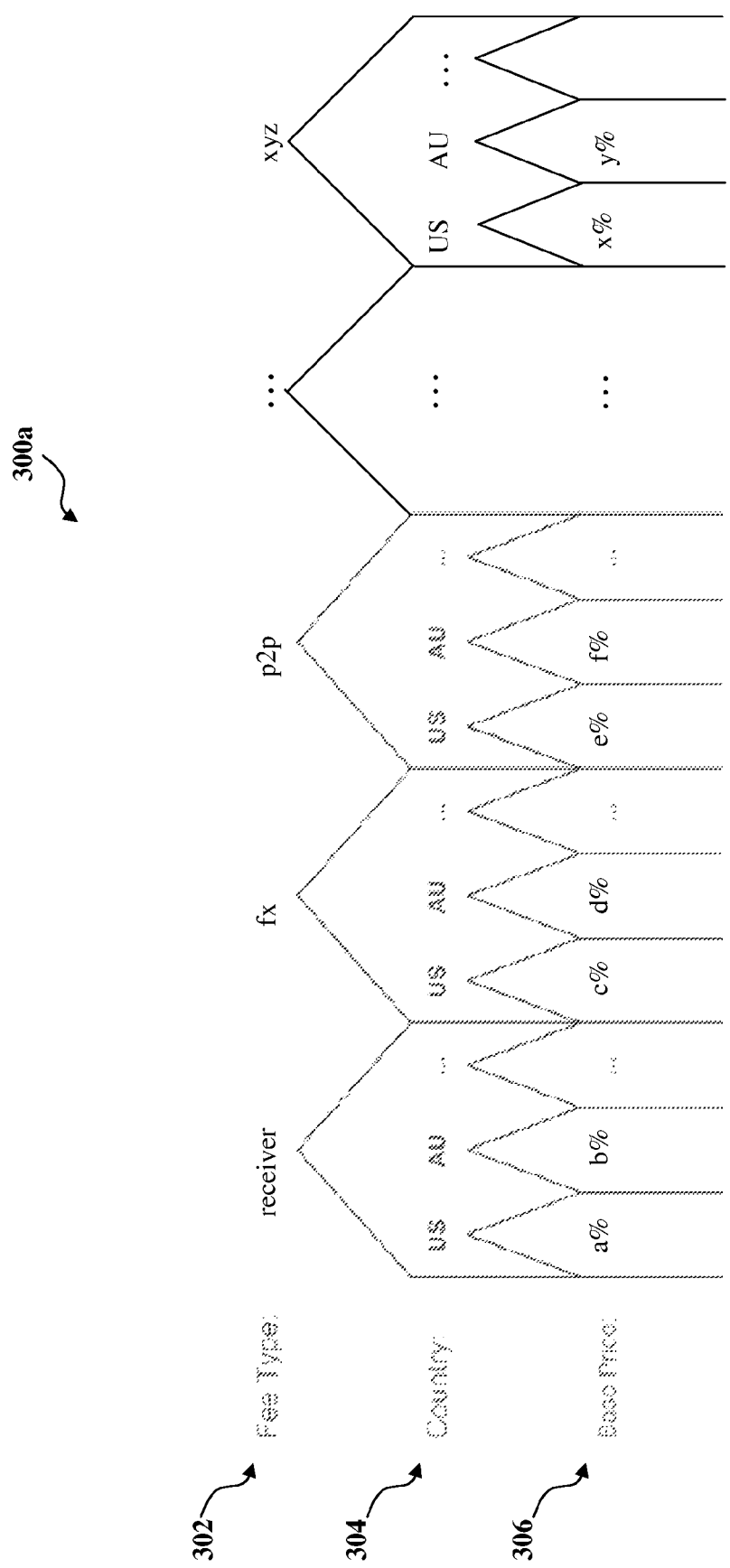
FIG. 3A illustrates a decision hierarchy for defining a default base fee based on fee type and country code.
Figure 3B:
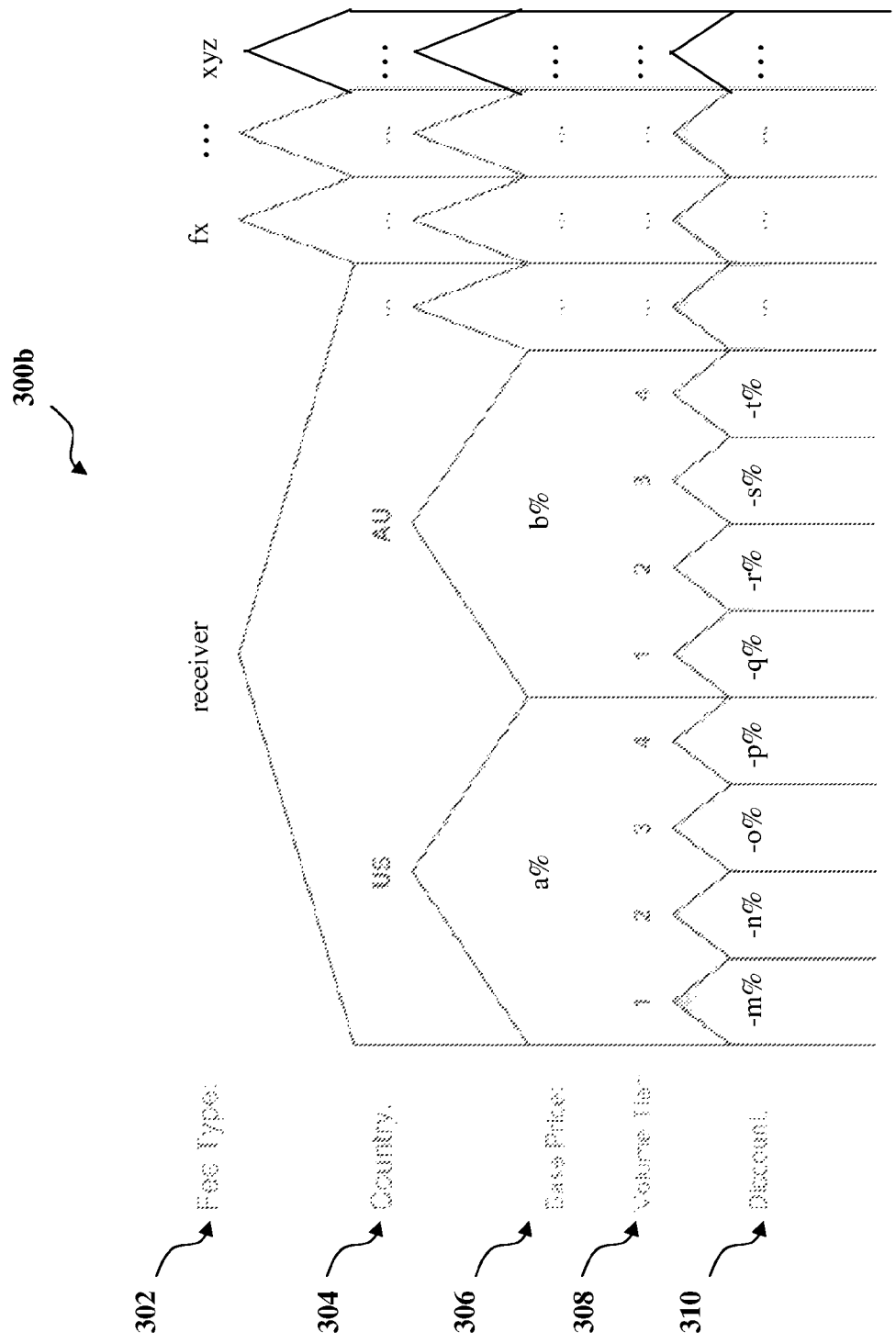
FIG. 3B illustrates a decision hierarchy further including a dynamic volume tier adjustment to the base fee, according to various aspects of the present disclosure.

Referring now to FIGS. 3A and 3B, an example decision hierarchy 300a for defining a base fee and an example decision hierarchy 300b including a dynamic volume tier adjustment to the base fee are illustrated, respectively, according to various aspects of the present disclosure. The decision hierarchy 300a includes a fee type row 302, a country code row 304, and a base fee transaction percentage row 306. Accordingly, a fee type is first switched on and then a user's country code is switched on to reach a base fee. Thus, two decision points exist before arriving at a base fee. In other embodiments, the decision hierarchy for defining a base fee may be alternatively organized such that a country code is first switched on prior to fee type.

In one example, fee type row 302 includes a receiver fee type, a foreign currency exchange ("fx") fee type, a personal payment ("p2p") fee type, and so on until an "xyz" fee type denoting a last fee type in the decision hierarchy. As many fee types as desired may be placed within the decision hierarchy. In a further example, fee type row 302 may further include a withdrawal fee type, a withdrawal return fee type, and/or an atm cash advance fee type.

Beneath each fee type is a plurality of country code designations in country code row 304, such as the United States ("US"), Australia ("AU"), and so on. As many country codes as desired may be placed within the decision hierarchy beneath each fee type.

Beneath each country code is a base fee transaction percentage in transaction percentage row 306 to be used as a default base fee transaction percentage, such as percentages "a" through "y" which are shown as examples. The example percentages "a" through "y" may be the same or different from one another, and may include decimal numbers to varying degrees.

FIG. 3B illustrates decision hierarchy 300b including a volume tier row 308 having dynamic volume tiers "1" through "4" beneath each country code and each base fee transaction percentage. Beneath each volume tier is a discount transaction percentage in a volume tier discount row 310 to be applied to each corresponding base fee transaction percentage. Accordingly, in one aspect of the present disclosure, volume tiers take the form of adjustments to the initial base fee. Discount percentages "-m" through "-t" are shown as examples. The example percentages "-m" through "-t" may be the same or different from one another, and may include decimal numbers to varying degrees. Although volume tiers "1" through "4" are shown, more or less volume tiers are within the scope of the present disclosure.

Referring now to FIG. 4, an example volume tier table 400 is shown according to various aspects of the present disclosure. Volume tier table 400 includes a country code column 402, a minimum volume column 404, a maximum volume column 406, a currency code column 408, a volume tier column 410, and an identifier column 412. Thus, volume tiers may be dynamically assigned and applied to a client by their month to date volume of fees or another volume-based parameter, which the server may check on database refresh and caching. In one example, the first group of volume tiers having a country code of "default" and a currency code of "USD" may be applied to merchants with a US dollar volume and a country code that does not match any other tiers. The second group of volume tiers having a country code of "US" and a currency code of "USD" may be applied to merchants with a US dollar volume and a US residence. The third group of volume tiers having a country code of "JP" and a currency code of "USD" may be applied to merchants with a US dollar volume and a Japanese residence. The fourth group of volume tiers having a country code of "default" and a currency code of "EUR" may be applied to merchants with a European euro volume and a country code that does not match any other tiers. The fifth group of volume tiers having a country code of "FR" and a currency code of "EUR" may be applied to merchants with a European euro volume and a French residence.

Figure 5:
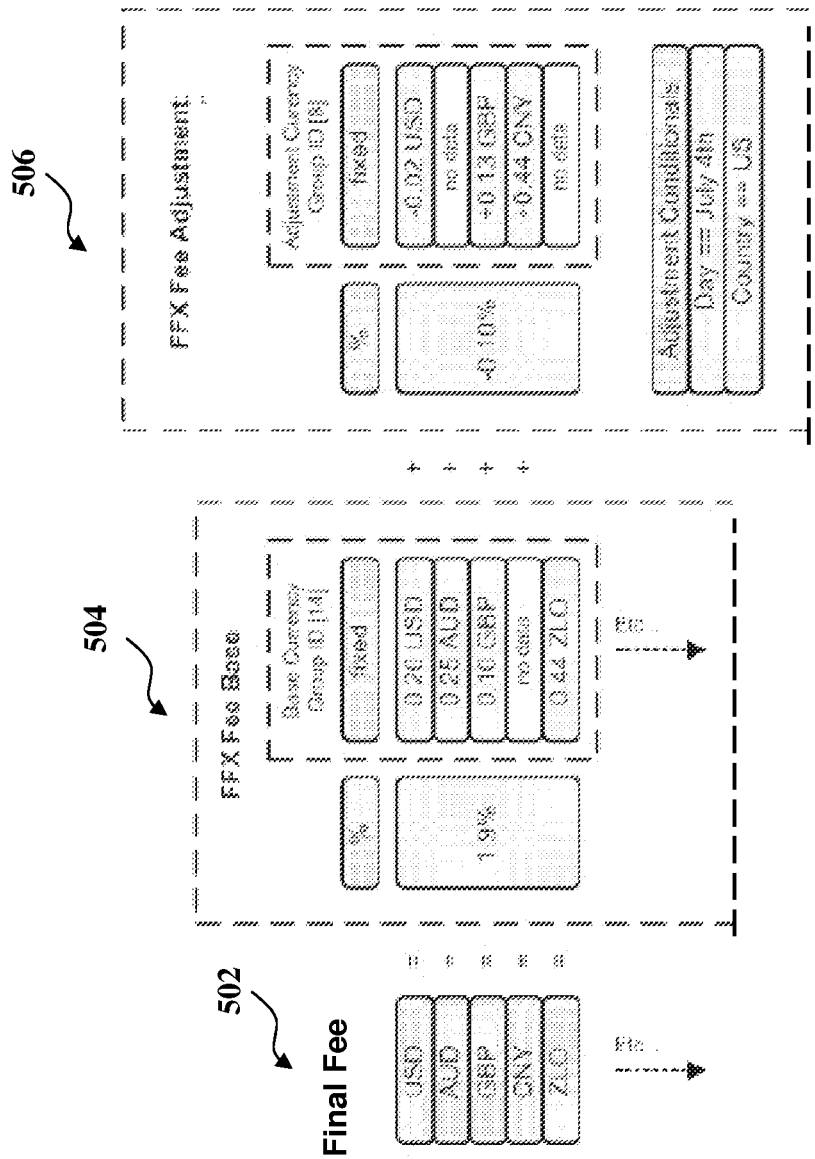
FIG. 5 illustrates a base fee, a fee adjustment, and a final fee calculation according to various aspects of the present disclosure.

Referring now to FIG. 5, a final fee 502, a base fee block 504, and a fee adjustment block 506 are illustrated as part of an example final fee calculation according to various aspects of the present disclosure. In one embodiment, final fee 502 includes a plurality of fees for each desired currency, such as the US dollar, the Australian dollar, the British pound, the Chinese yen, and the Polish zlotys. Base fee block 504 includes a transaction percentage of 1.9 and a plurality of fixed amounts for a plurality of currencies based upon a looked up fee type. Adjustment block 506 includes a discount percentage of −0.10 and a plurality of fixed amounts for a plurality of currencies based upon a looked up fee type and/or client identifier, in one example. Adjustment block 506 further includes a plurality of adjustment conditions, such as the day equals July $4^{th}$ and the country code is the US. The final fee 502 is the sum of the selected base fee in block 504 and the fee adjustment in block 506 if the adjustment conditions are met or determined to be true.

For an example financial transaction involving 200 pounds in the United States on July 4$^{th}$, the final fee is calculated as follows:

3.83 GBP=[200 GBP*1.9%+0.10 GBP]+[200 GBP*-0.10%+0.13 GBP] (the fee adjustment is applied as the condition set is met).

For an example financial transaction involving 200 pounds in the United States not on July 4$^{th}$, the final fee is calculated as follows:

3.90 GBP=[200 GBP*1.9%+0.10 GBP]+[0] (the fee adjustment is not applied as adjustment conditions are not true or met)

In one example, the transaction percentages and fixed amounts are treated separately, and transaction percentages only apply to the original transaction amount. In yet another example, numbers may be rounded, if necessary, at the end of a final fee calculation. In yet another example, adjustments may change the base fee transaction percentage, the base fee fixed amount, or both.

Figure 6:
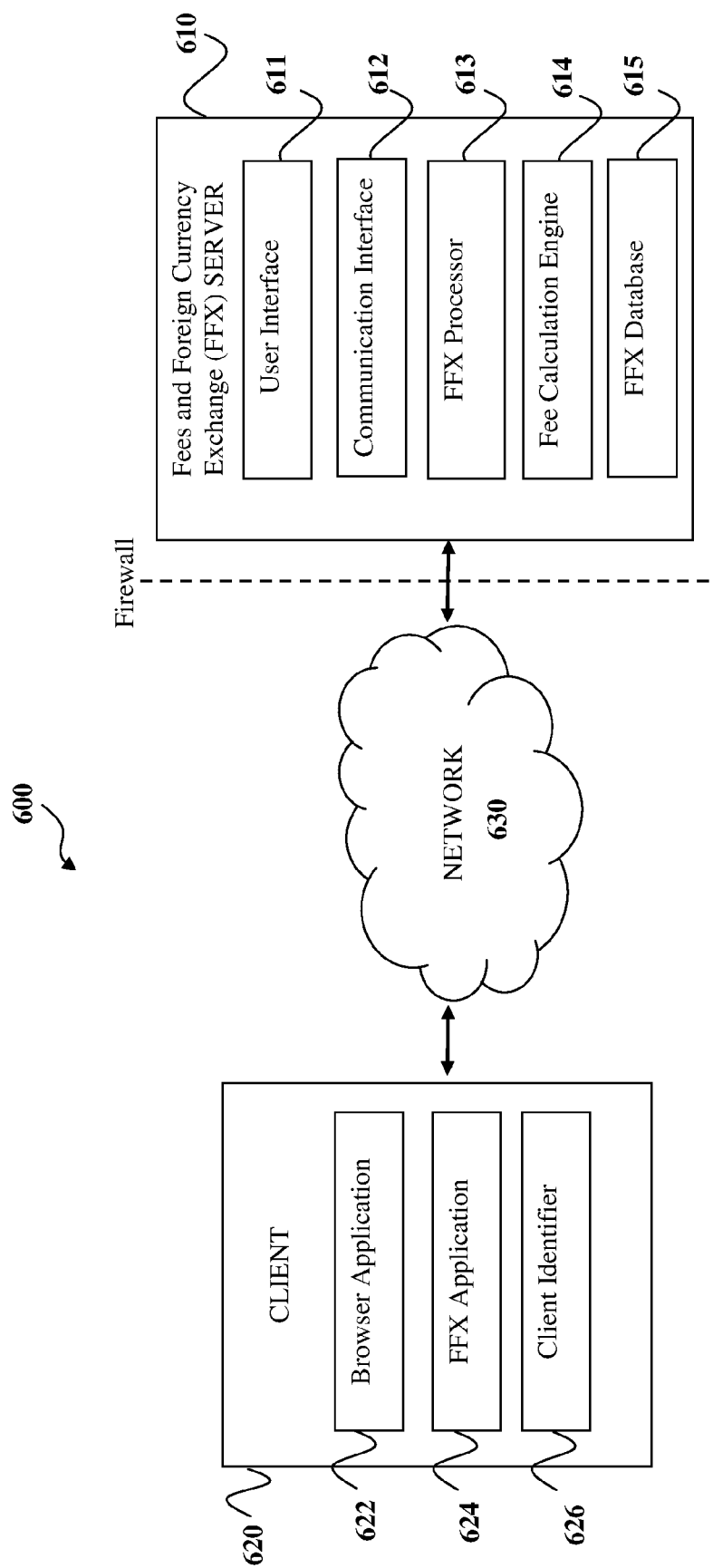
FIG. 6 illustrates a block diagram of a networked system including a client device and a fees and foreign currency exchange (FFX) server configured to provide fee calculations for various online financial transactions according to various aspects of the present disclosure.

Referring now to FIG. 6, a block diagram is illustrated of a networked system 600 configured to provide various fee calculation requests and fee calculations related to financial transactions over the network conducted by various clients on the network. In one embodiment, system 600 includes a fee calculation server also referred to as a fees and foreign currency exchange (FFX) server 610 and a client device 620 of a plurality of client devices in communication with the FFX server 610 over a network 630.

FFX server 610 may be maintained, for example, by an online payment service provider (e.g., PayPal) offering flexible and efficient fee calculations to online clients, such as merchant sellers, buyers, and/or any entity involved in an online financial transaction, such as sales, currency exchange, withdrawal, deposits, etc. In one embodiment, the payment service provider may provide services in exchange for payment, such as by commission or a transaction fee, to be received over network 630 in one example. In one embodiment, FFX server 610 may be provided and/or operated by eBay, Inc. of San Jose, Calif.

FFX server 610 is configured to communicate over network 630 with a user interface 611 and/or a communication interface 612 such as a browser application. For example, in one embodiment, a client device undergoing a financial transaction, such as withdrawal of funds, receipt of funds, currency exchange, or other financial transaction, may interact with FFX server 610 through a browser application over network 630 in order to provide information to the server related to selected financial transactions such as transaction costs, countries involved in a financial transaction, client and/or user identifiers, and so on. In one aspect, communication interface 612 is configured to receive a fee calculation request from client device 620, wherein the fee calculation request is linked to an online financial transaction associated with a fee type, a country code, and a client identifier. Client device 620 provides at least the fee type, the country code, and the client identifier associated with the financial transaction upon the fee calculation request.

FFX server 610 includes a processor 613 coupled to a memory holding a fee calculation engine 614. In one aspect, the processor is configured to: associate a fee type and a country code to a financial transaction; access a cached database including a plurality of overriding base fees each linked to a client identifier, and a plurality of default base fees each linked to a fee type and a country code; determine the applicability of an overriding base fee; determine a default base fee if an overriding base fee is not applicable; select between an overriding base fee and a default base fee to provide an initial base fee; determine the applicability of any adjustments to the initial base fee based upon met conditions; apply any applicable adjustments to the initial base fee to calculate a final fee; and charge a client account the final fee for a requested financial transaction. The processor 613 is further configured to apply a discount transaction percentage from the initial base fee based upon volume tiers associated with the client identifier, wherein a volume tier is determined by a monthly total payment volume or other volume-based parameter associated with the client identifier.

In this regard, FFX server 610 may maintain a plurality of client accounts and includes an FFX database 615 having overriding base fee data, default base fee data, initial base fee data, fee type data, country code data, adjustment and condition data, volume tier data, and/or client identifier data. FFX database 615 may further have client account fund data including account fund amounts, history of transactions, fund distributions, etc. Client accounts may be associated with individual users or groups such as corporations or charitable organizations. FFX server 610 may also have access to other data, such as tracking data, and/or data from third-parties such as eBay, Google, Yahoo, etc. The data in FFX database 614 may be kept in raw data form, via codes, via identifiers, or other links. FFX database 615 is not limited to a single database but may be comprised of a plurality of databases in one aspect. Furthermore, FFX database 615 is not limited to being physically contained within server 610 but may be located in a separate geographic location from the server while maintaining operable communication with the other components of FFX server 610.

Client device 620 may be implemented using any appropriate combination of hardware and/or software configured for wired and/or wireless communication over network 630. For example, in one embodiment, client device 620 may be implemented as a personal computer of a user in communication with the Internet. In other embodiments, client device 630 may be implemented as a wireless telephone, personal digital assistant (PDA), notebook computer, and/or other types of computing devices. Client device 620 may also be part of its own computer network.

As shown, client device 620 may include one or more browser applications 622 which may be used, for example, to provide a convenient interface to permit a financial transaction over network 630. For example, in one embodiment, browser application 622 may be implemented as a web browser configured to view or publish information over the Internet.

Client device 620 also includes one or more FFX applications 624 which may be used, for example, to provide client-side processing for performing desired tasks in response to operations selected by the client. In one aspect, FFX application 624 may display a client user interface in connection with browser application 622 that is configured to allow the client to select a fee type, country code, currency exchange information, dates, and the like to be associated with the financial transaction. The application 624 may also confirm the final fee with the client user and acceptance of such a fee associated with a proposed financial service.

Client device 620 may further include other applications as may be desired in particular embodiments to provide desired features to the client device. For example, in various embodiments, such other applications may include security applications for implementing client-side security features, programmatic client applications for interfacing with appropriate application programming interfaces (APIs) over network 630, and/or other types of applications.

As also shown in FIG. 6, client device 620 may include one or more client identifiers 626 which may be implemented, for example, as operating system registry entries, cookies associated with browser application 622, identifiers associated with hardware of client device 620, or other appropriate identifiers. In one embodiment, client identifier 626 may be used by FFX server 610 to track selected financial transactions, track account distributions, associate a client with a particular account maintained by the FFX server, and the like.

Network 630 may be implemented as a single network or a combination of multiple networks. For example, in various embodiments, network 630 may include the Internet or one or more intranets, landline networks, wireless networks, and/or other appropriate types of networks.

Figure 7:
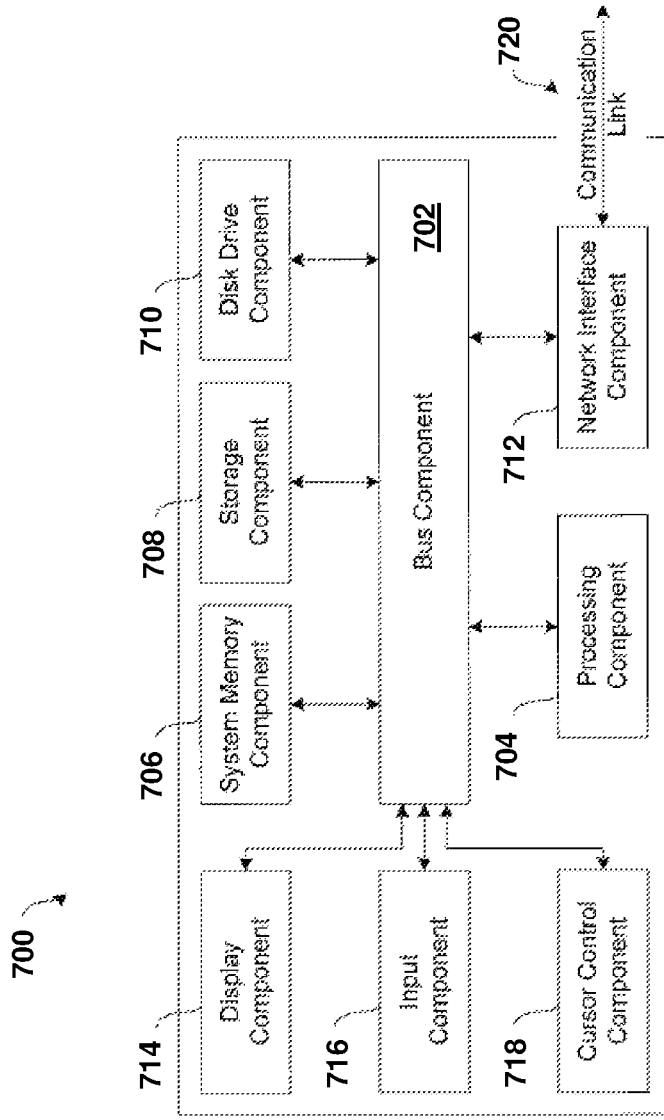
FIG. 7 illustrates a block diagram of a computer system suitable for implementing one or more embodiments of the present disclosure according to various aspects of the present disclosure.

Referring now to FIG. 7 in conjunction with FIG. 6, a block diagram is illustrated of a computer system 700 suitable for implementing one or more embodiments of the present disclosure, including the FFX server 610 or the client device 620. In various implementations, the client device 620 may comprise a personal computing device capable of communicating with the network 630, such as a personal computer, laptop, cell phone, PDA, etc., and the FFX server 610 may comprise a network computing device, such as a network server. Hence, it should be appreciated that each of the apparatus 610 and 620 may be implemented at least in part by computer system 700 in a manner as follows.

In accordance with various embodiments of the present disclosure, computer system 700, such as a personal computer and/or a network server, includes a bus 702 or other communication mechanism for communicating information, which interconnects subsystems and components, such as processing component 704 (e.g., processor, micro-controller, digital signal processor (DSP), etc.), system memory component 706 (e.g., RAM), static storage component 708 (e.g., ROM), disk drive component 710 (e.g., magnetic or optical), network interface component 712 (e.g., modem or Ethernet card), display component 714 (e.g., CRT or LCD), input component 716 (e.g., keyboard), and cursor control component 718 (e.g., mouse or trackball). In one implementation, disk drive component 710 may comprise a database having one or more disk drive components.

In accordance with embodiments of the present disclosure, computer system 700 performs specific operations by processor 704 executing one or more sequences of one or more instructions contained in system memory component 706. Such instructions may be read into system memory component 706 from another computer readable medium, such as static storage component 708 or disk drive component 710. In other embodiments, hard-wired circuitry may be used in place of or in combination with software instructions to implement the present disclosure.

Logic may be encoded in a computer readable medium, which may refer to any medium that participates in providing instructions to processor 704 for execution. Such a medium may take many forms, including but not limited to, non-volatile media, volatile media, and transmission media. In various implementations, non-volatile media includes optical or magnetic disks, such as disk drive component 710, volatile media includes dynamic memory, such as system memory component 706, and transmission media includes coaxial cables, copper wire, and fiber optics, including wires that comprise bus 702. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice embodiments of the present disclosure may be performed by computer system 700. In various other embodiments of the present disclosure, a plurality of computer systems 700 coupled by communication link 720 (e.g., network 630 of FIG. 6, such as a LAN, WLAN, PTSN, and/or various other wired or wireless networks, including telecommunications, mobile, and cellular phone networks) may perform instruction sequences to practice the present disclosure in coordination with one another.

Computer system 700 may transmit and receive messages, data, information and instructions, including one or more programs (i.e., application code) through communication link 720 and communication interface 712. Received program code may be executed by processor 704 as received and/or stored in disk drive component 710 or some other non-volatile storage component for execution.

The present disclosure provides for many different embodiments. One of the broader forms of the present disclosure involves a method of calculating a fee for an online transaction. The method includes receiving a fee calculation request linked to an online financial transaction associated with a fee type, a country code, and a client identifier; and then selecting, using a microprocessor, an initial base fee from either a default base fee determined by the fee type and the country code or from an overriding base fee associated with the financial transaction, wherein the initial base fee includes a transaction percentage and a fixed amount. The method further includes applying, using the microprocessor, at least one adjustment to the initial base fee to calculate a final fee, the at least one adjustment being applied when an associated condition set is determined to be true.

Another of the broader forms of the present disclosure involves a method of calculating a fee for an online transaction. The method includes receiving a fee calculation request linked to an online financial transaction associated with a fee type, a country code, and a client identifier; and accessing a cached database including a plurality of overriding base fees each linked to a client identifier, and a plurality of default base fees each linked to a fee type and a country code. The method further includes selecting, using a microprocessor, an initial base fee from either a default base fee determined by the fee type and the country code or from an overriding base fee associated with the financial transaction, wherein the initial base fee includes a transaction percentage and a fixed amount; and then applying, using the microprocessor, a plurality of adjustments to the initial base fee to calculate a final fee, each of the plurality of adjustments being applied when an associated condition set is determined to be true.

Yet another of the broader forms of the present disclosure involves a fee calculation server. The server includes a communication interface configured to receive a fee calculation request linked to an online financial transaction associated with a fee type, a country code, and a client identifier; a database including a plurality of overriding base fees each linked to a client identifier, and a plurality of default base fees each linked to a fee type and a country code; and a processor coupled to a memory. The processor is programmed to calculate a final fee by: determining whether an overriding base fee is associated with the financial transaction; selecting an initial base fee from either a default base fee determined by the fee type and the country code or from an overriding base fee associated with the financial transaction, wherein the initial base fee includes a transaction percentage and a fixed amount; and applying at least one adjustment to the initial base fee to calculate the final fee, the at least one adjustment being applied when an associated condition set is determined to be true.

Advantageously, the present disclosure provides a versatile, dynamic, and efficient fee calculation method, server, and system for a large number of financial transactions over a network.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method of calculating a fee for an online financial transaction, the method comprising:
   receiving a fee calculation request linked to an online financial transaction associated with a fee type, a country code, and a client identifier;
   determining, using a hardware processor, whether an overriding base fee applies based on the client identifier;
   selecting, using the hardware processor, the overriding base fee as an initial base fee upon determining that the overriding base fee lies wherein the overriding base fee is determined by looking up a database with the client identifier, and wherein the initial base fee comprises a sum of a transaction percentage component and a fixed amount component;
   selecting, using the hardware processor, a default base fee as the initial base fee upon determining that the overriding base fee does not apply, wherein the default base fee is determined by looking up the database with the fee type and the country code; and
   applying, using the hardware processor, at least one adjustment to the initial base fee to calculate a final fee, the at least one adjustment being applied when an associated condition set is determined to be true.

2. The method of claim 1, wherein the fee type is one of a receiver fee, a personal payment fee, a withdrawal fee, a withdrawal return fee, an atm cash advance fee, or a currency exchange fee.

3. The method of claim 1, wherein the overriding base fee is a promotional base fee or a contractual base fee.

4. The method of claim 1, wherein the at least one adjustment separately adjusts the transaction percentage component and the fixed amount component of the initial base fee.

5. The method of claim 1, wherein a condition of the condition set is selected from a transaction amount, a funding source, a sender country, a receiver country, a payment flow type, a cross border transaction, a foreign currency exchange, or a combination thereof.

6. The method of claim 1, wherein a condition of the condition set includes a time constraint or a maximum or minimum fee constraint.

7. The method of claim 1, further comprising applying a discount transaction percentage to the initial base fee determined by a dynamic volume tier associated with the client identifier.

8. The method of claim 7, wherein the dynamic volume tier is determined by a monthly total payment volume associated with the client identifier.

9. The method of claim 1, wherein the at least one adjustment comprises a plurality of adjustments to the initial base fee, each of the plurality of adjustments being applied when an associated condition set is determined to be true.

10. The method of claim 1, wherein the database is looked up by accessing a cached copy of the database including a plurality of overriding base fees each linked to a client identifier, and a plurality of default base fees each linked to a fee type and a country code.

11. A system comprising:
    a communication interface configured to receive a fee calculation request linked to an online financial transaction associated with a fee type, a country code, and a client identifier;
    a database including a plurality of overriding base fees each linked to a client identifier, and a plurality of default base fees each linked to a fee type and a country code; and
    a processor communicatively coupled to the communication interface and the database, wherein the processor is configured to calculate a final fee by:
       determining whether an overriding base fee applies based on the client identifier;
       selecting the overriding base fee as an initial base fee upon determining that the overriding base fee applies, wherein the overriding base fee is determined by looking up a database with the client identifier, and wherein the initial base fee comprises a sum of a transaction percentage component and a fixed amount component;
       selecting a default base fee as the initial base fee upon determining that the overriding base fee does not apply, wherein the default base fee is determined by looking up the database with the fee type and the country code; and
       applying at least one adjustment to the initial base fee to calculate the final fee, the at least one adjustment being applied when an associated condition set is determined to be true.

12. The system of claim 11, wherein the fee type is one of a receiver fee, a personal payment fee, a withdrawal fee, a withdrawal return fee, an atm cash advance fee, or a currency exchange fee.

13. The system of claim 11, wherein the overriding base fee is a promotional base fee or a contractual base fee.

14. The system of claim 11, wherein the at least one adjustment separately adjusts the transaction percentage component and the fixed amount component of the initial base fee.

15. The system of claim 11, wherein a condition of the condition set is selected from a transaction amount, a funding source, a sender country, a receiver country, a payment flow type, a cross border transaction, a foreign currency exchange, or a combination thereof.

16. The system of claim 11, wherein a condition of the condition set includes a time constraint or a maximum or minimum fee constraint.

17. The system of claim 11, wherein the processor is further configured to calculate the final fee by applying a discount transaction percentage to the initial base fee determined by a volume tier associated with the client identifier.

18. The system of claim 17, wherein the volume tier is determined by a monthly total payment volume associated with the client identifier.

19. The system of claim 11, wherein the at least one adjustment comprises a plurality of adjustments to the initial base fee, each of the plurality of adjustments being applied when an associated condition set is determined to be true.

20. The system of claim 11, wherein the processor is further configured to access a cached copy of the database.

* * * * *